United States Patent [19]

Adachi et al.

[11] Patent Number: 5,144,458
[45] Date of Patent: Sep. 1, 1992

[54] TOTAL CONTACT TYPE IMAGE SENSOR

[75] Inventors: Kazuhiko Adachi, Shibatamachi; Masafumi Kumano, Sendai, both of Japan

[73] Assignees: Ricoh Company, Ltd., Tokyo; Ricoh Research Institute of General Electronics Co., Ltd., Natori, both of Japan

[21] Appl. No.: 519,756

[22] Filed: May 7, 1990

[30] Foreign Application Priority Data

May 12, 1989 [JP] Japan .................................. 1-119660

[51] Int. Cl.$^5$ ............................................. H04N 3/14
[52] U.S. Cl. ................................ 358/482; 358/213.13
[58] Field of Search ............................... 358/482–483, 358/471, 213.11–213.13; 250/578

[56] References Cited

U.S. PATENT DOCUMENTS

| | | | |
|---|---|---|---|
| 4,149,197 | 4/1979 | Kos et al. | 358/471 |
| 4,691,243 | 9/1987 | Cannella et al. | 358/213.12 |
| 4,691,244 | 9/1987 | Cannella et al. | 358/213.12 |
| 4,768,096 | 8/1988 | Cannella et al. | 358/213.13 |
| 4,777,534 | 10/1988 | Yaniv et al. | 358/213.13 |
| 4,868,664 | 9/1989 | Yaniv et al. | 358/213.13 |
| 4,910,412 | 3/1990 | Ondris | 358/213.13 |

*Primary Examiner*—Stephen Brinich
*Attorney, Agent, or Firm*—Oblon, Spivak, McClelland, Maier & Neustadt

[57] ABSTRACT

A total contact type image sensor includes a transparent substrate, an opaque layer formed on the transparent substrate and having document illuminating windows, a photosensitive layer formed on the transparent substrate and the opaque layer, a plurality of photoelectric conversion elements arranged on the transparent substrate with a predetermined pitch, and a transparent protection layer which covers a surface of a stacked structure which is made up of the transparent substrate, the opaque layer, a photosensitive layer and the photoelectric conversion elements. The photoelectric conversion elements respectively have at least one concave portion in a plan view of the total contact type image sensor. The document illumination windows are respectively formed on a periphery of a corresponding one of the photoelectric conversion elements with a 1:1 relationship, and the document illuminating window respectively have at least one convex portion in the plan view in correspondence with the concave portion of a corresponding one of the photoelectric conversion elements so as to surround the corresponding one of the photoelectric conversion elements.

24 Claims, 9 Drawing Sheets

FIG. 18
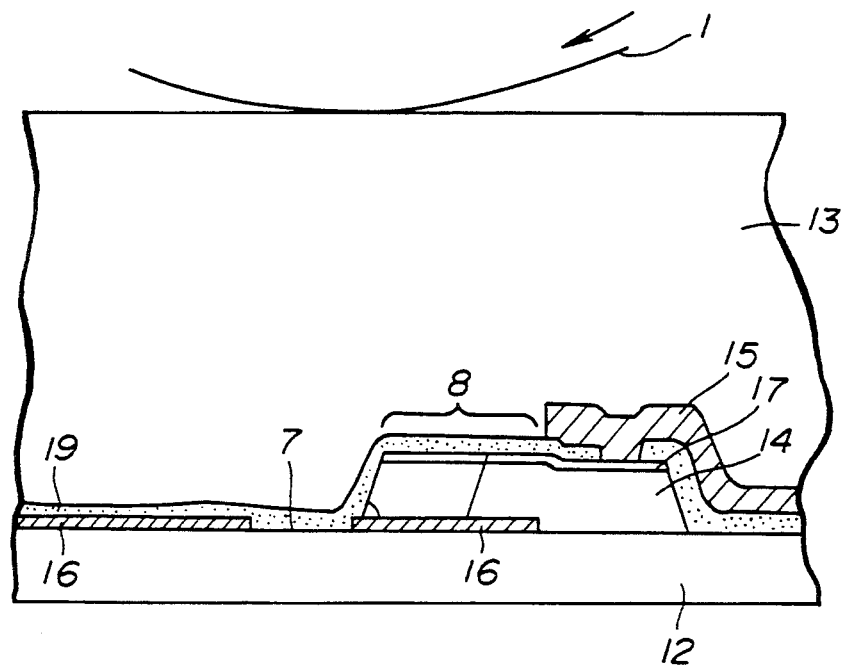
FIG. 19A    FIG. 19B    FIG. 19C
  

TOTAL CONTACT TYPE IMAGE SENSOR

BACKGROUND OF THE INVENTION

The present invention generally relates to total contact type image sensors, and more particularly to a total contact type image sensor which is suited for use in an image reading device which reads a large image and is provided in a facsimile machine, a computer, a word processor and the like.

An image sensor converts an image such as characters and pictures into an electrical signal, and is used in a facsimile machine and the like.

Conventionally, a charge coupled device (CCD) is generally used as the image sensor. The CCD is made of single crystal silicon and the size thereof is only in the range of 25 mm.

For this reason, when reading a document having the A4 size by use of the CCD, the overall size of the document reader becomes large because it is necessary to provide a reduction optical system and an optical path in the range of 300 mm. In addition, there is a problem in that the adjustment of the reduction optical system is complex.

FIG. 1 shows the structure of the conventional image sensor using the CCD. The image sensor shown in FIG. 1 includes a light source 2 for illuminating a document 1, a reduction lens 3 and a CCD 4.

FIG. 2 shows a contact type image sensor which was proposed to eliminate the problems of the conventional image sensor which uses the reduction optical system. The contact type image sensor shown in FIG. 2 includes an image sensor 6 which has the same size as the document 1 and is designed to read the document 1 with a 1:1 magnification. An imaging lens 5 such as a SELFOC lens and a roof mirror lens array is provided to image the characters and pictures included in the document 1 on the image sensor 6 with the 1:1 magnification.

The optical path of the imaging lens 5 is in the range of 10 to 20 mm and short. This optical path is 1/15 to 1/30 times the optical path of the image sensor which uses the CCD 4. Thus, the overall size of the document reader can be reduced by use of the contact type image sensor. In addition, there is an advantage in that it is possible to omit the expensive reduction lens 3.

However, the contact type image sensor suffers from disadvantages in that it is necessary to provide the imaging lens 5, the optical system requires adjustment, the optical path is 15 to 20 mm, and the light transmitting efficiency and the resolution of the imaging lens 5 are poor.

On the other hand, a total contact type image sensor was proposed to eliminate the disadvantages of the contact type image sensor. The total contact type image sensor includes photoelectric conversion elements which make total contact with the document via a transparent member which has a thickness in the range of 10 to 100μm. No imaging lens is required in the total contact type image sensor. Hence, it is possible to reduce both the size and cost of the document reader.

In addition, because total contact type image sensor reads the document by making total contact with the document, it is possible to realize high light transmitting efficiency and high resolution.

In order to ensure a high resolution and a high signal-to-noise (S/N) ratio with the total contact type image sensor, it is necessary to illuminate the picture elements which make up the document with a high brightness and minimize the crosstalk from the adjacent photoelectric conversion elements.

Various optical systems have been proposed heretofore for the purpose of realizing the total contact type image sensor having high resolution and high S/N ratio.

FIG. 3 is a plan view showing one proposed total contact type image sensor. In FIG. 3, an array of photoelectric conversion elements 8 and an array of document illumination windows 7 are arranged parallel to each other. The document illumination windows 7 are formed in a light shielding layer 10. The photoelectric conversion elements 8 and the document illumination windows 7 are formed with a 1:1 relationship so as to improve the resolution, and the crosstalk from the adjacent photoelectric conversion elements is reduced.

FIG. 4 shows a cross sectional view of the total contact type image sensor shown in FIG. 3.

A description will now be given of the operating principle of the total contact type image sensor shown in FIGS. 3 and 4. A bundle of rays emitted from the light source 2 illuminates the document 1 via a transparent substrate 12, the document illumination windows 7 and a transparent protection layer 13. A reflected light which has an intensity dependent on the image tone of the document 1 is received by the photoelectric conversion elements 8 via the transparent protection layer 13. The photoelectric conversion elements 8 convert the received reflected light into corresponding electrical signals.

By illuminating the document 1 via the document illumination windows 7, the light from the light source 2 is blocked at portions where the document illumination windows 7 are not provided. Only the reflected light from the document 1 reaches the photoelectric conversion elements 8, and it is therefore possible to improve both the resolution and the S/N ratio.

In a case where the photoelectric conversion elements 8 are provided with a density of 8 bit/mm, for example, the photoelectric conversion elements 8 are provided with a pitch of $\frac{1}{8}$ mm = 125 μm. An area c×d of the photoelectric conversion element 8 is approximately 100 μm × 100 μm, and an area a×b of the document illumination window 7 is approximately 100 μm × 100 μm. A thickness f of the photoelectric conversion element 8 is 1 to 2 μm when an amorphous silicon thin film is used as the photosensitive material. A thickness e of the transparent protection layer 13 is 20 to 100 μm.

The transparent protection layer 13 has a function of protecting the photoelectric conversion elements 8 from air and friction which is generated when the total contact type image sensor makes sliding contact with the document 1, and also a function of securing an optical path which is required to effectively receive the reflected light from the document 1. For this reason, the thickness e of the transparent protection layer 13 greatly affects the resolution and S/N ratio of the total contact type image sensor. Generally, the crosstalk from the adjacent photoelectric conversion elements decreases and the resolution is improved when the thickness e of the transparent protection layer 13 is small, but the S/N ratio deteriorates when the thickness e of the transparent protection layer 13 is too small. Hence, the thickness e of the transparent protection layer 13 is appropriately selected by balancing the resolution and the S/N ratio.

A description will be given of a case where the thickness e of the transparent protection layer 13 is selected from the point of view of improving the S/N ratio when the photoelectric conversion elements 8 are provided with the density of 8 bit/mm. When it is assumed that one side b of the document illumination window 7 and one side c of the photoelectric conversion element 8 are 100 μm and the thickness f of the photoelectric conversion element 8 is 2 μm, the thickness e of the transparent protection layer 13 can be calculated from the following formula (1).

$$e \approx (c/\tan\theta) + f \qquad (1)$$

When $\theta$ denotes the incident angle for a case where the picture element illuminance becomes ½ on the photoelectric conversion elements 8, $\theta$ is approximately 60° from the cosine law.

Therefore, the thickness e of the transparent protection layer 13 calculated from the formula (1) becomes approximately 60 μm. When the photoelectric conversion elements 8 are provided with a higher density such as 16 bit/mm, $c \approx 50$ μm and the thickness e must be set to a small value in the order of 30 μm.

The reflected light from the document 1 is a diffused light which scatters in various directions. Hence, effectively receiving the reflected light becomes the condition for obtaining the high S/N ratio.

The light receiving efficiency will now be obtained for the case where the photoelectric conversion elements 8 are provided with the density of 8 bit/mm. A region where the reflected light illuminance becomes ½ the document surface illuminance is first obtained. When a distance between this region and the document illumination window 7 is denoted by l', l' becomes approximately 35 μm from the following formula (2).

$$l' = (e-f)\tan(90° - \theta) \qquad (2)$$

In other words, the reflected light reaches a portion 35 μm on the outer side of the document illumination window 7. Accordingly, a gap g between the document illumination window 7 and the photoelectric conversion element 8 is 5 to 10 μm and close. Furthermore, according to the total contact type image sensor having the structure shown in FIG. 3, the photoelectric conversion element 8 is arranged on one side of the document illumination window 7 and the photoelectric conversion element 8 only receives approximately 12% of the reflected light. For this reason, a high S/N ratio cannot be expected.

In FIG. 5, a region to where the reflected light reaches is indicated by a hatching.

When the thickness e of the transparent protection layer 13 is set to a large value, the illuminance on the photoelectric conversion element 8 becomes high but the crosstalk to the adjacent photoelectric conversion elements 8 increases as shown in FIG. 5. As a result, it is impossible to obtain a high resolution.

For the above described reasons, it is difficult to obtain high resolution and high Ser. No. ratio with the total contact type image sensor shown in FIG. 3.

In addition, the total contact type image sensor shown in FIG. 3 requires the transparent protection layer 13 which has the thickness of 50 to 100 μm in order to direct the reflected light from the document 1 on all of the photoelectric conversion elements 8. Consequently, the resolution deteriorates when an attempt is made to obtain a high S/N ratio. However, if the photoelectric conversion elements 8 were arranged to surround the document illumination windows 7, the transparent protection layer 13 will become thin, the crosstalk to the adjacent photoelectric conversion elements 8 will decrease, and it will be possible to improve both the resolution and the S/N ratio. A Japanese Laid-Open Patent Application No.59-48954 proposes such a total contact type image sensor.

FIGS. 6 and 7 are a cross sectional view and a plan view respectively showing the total contact type image sensor proposed in the Japanese Laid-Open Patent Application No.59-48954. As shown in FIGS. 6 and 7, this proposed total contact type image sensor has the document illumination window 7 provided within the photoelectric conversion element 8. According to this structure of the total contact type image sensor, it is possible to suppress the crosstalk to the adjacent photoelectric conversion elements 8 and improve the light receiving efficiency without deteriorating the resolution. When the photoelectric conversion elements 8 are provided with the density of 8 bit/mm, one side c (or d) of the photoelectric conversion element 8 is approximately 100 μm, one side a (or b) of the document illumination window 7 is approximately 10 to 60 μm, and the thickness f of the photoelectric conversion element 8 is approximately 1 to 2 μm when the amorphous silicon thin film is used as the photosensitive material.

Based on the formula (1), the thickness e of the transparent protection layer 13 can be calculated as follows.

$$e \approx (c/2) \times (1/\tan\theta) + f \approx 30 \text{ μm}$$

Therefore, the thickness e can be made thin. For this reason, there is an advantage in that the transparent protection layer 13 can be formed uniformly from $SiO_2$, $Si_3N_4$ and the like using thin film techniques such as sputtering, plasma chemical vapor deposition (CVD) and evaporation.

Next, a region where the reflected light illuminance becomes ½ the document surface illuminance will be obtained similarly as in the case of FIG. 3. From the formula (2), the distance l' between this region and the document illumination window 7 is approximately 20 μm in this case. It is possible to illuminate the photoelectric conversion elements 8 in their entirety when one side a (or b) of the document illumination window 7 is 60 μm, as may be seen from FIG. 8. As shown in FIG. 8, the light receiving region is large compared to that of the total contact type image sensor shown in FIG. 3, and the crosstalk to the adjacent photoelectric conversion elements 8 is small.

However, according to the total contact type image sensor shown in FIG. 6, there is a limitation in that the document illumination window 7 must be provided within the photoelectric conversion element 8. For this reason, when the density of the photoelectric conversion elements 8 is increase to 16 bit/mm, for example, one side c (or d) of the photoelectric conversion element 8 becomes approximately 50 μm and one side a (or b) of the document illumination window 7 must be approximately 20 to 30 μm. Consequently, the area of the document illumination window 7 becomes approximately 36% of the area of the document illumination window 7 shown in FIG. 3, and the S/N ratio becomes poor due to the decrease in the document surface illuminance.

Furthermore, as may be seen from FIG. 6, a stepped portions are formed on the surface of the transparent protection layer 13 depending on the structure of the photoelectric conversion elements 8. In other words, the surface of the transparent protection layer 13 rises by 1 to 2 μm at the portion corresponding to the photoelectric conversion element 8 and falls at the portion corresponding to the document illumination window 7.

The surface portion of the transparent protection layer 13 is shown in FIG. 9. In FIG. 9, the document transport direction is indicated by an arrow DT. When the document 1 makes sliding contact with the concavoconvex surface of the transparent protection layer 13, foreign particles 18 including dust particles, fine fragments of paper and ink residue from ball-point pens easily adhere on stepped portions 13a and 13b of the transparent protection layer 13. As a result, the optical output and the resolution of the total contact type image sensor deteriorate when such foreign particles 18 adhere on the surface of the transparent protection layer 13.

On the other hand, a total contact type image sensor shown in FIG. 10 is proposed in a Japanese Laid-Open Patent Application No. 58-38061. According to this proposed total contact type image sensor, the document illumination windows 7 have the shape of slits extending parallel to the document transport direction. The foreign particles are less likely to adhere on the surface of the transparent protection layer 13 when compared to the total contact type image sensor shown in FIG. 6, but there is still the limitation to provide the document illumination window 7 within the photoelectric conversion element 8. For this reason, the document surface illuminance is poor due to the small document illumination window 7 and a high S/N ratio cannot be obtained, similarly as in the case of the total contact type image sensor shown in FIG. 6.

Therefore, according to the prior art, it is difficult to realize a total contact type image sensor having high resolution and high S/N ratio. In addition, stepped portions are formed on the surface of the transparent protection layer and foreign particles easily adhere on the stepped portions thereby deteriorating the resolution and S/N ratio of the total contact type image sensor.

SUMMARY OF THE INVENTION

Accordingly, it is a general object of the present invention to provide a novel and useful total contact type image sensor in which the problems described above are eliminated.

Another and more specific object of the present invention is to provide a total contact type image sensor including a transparent substrate, an opaque layer formed on the transparent substrate with document illuminating windows. A photosensitive layer is formed on the transparent substrate and the opaque layer, and a plurality of photoelectric conversion elements are arranged on the transparent substrate with a predetermined pitch. A transparent protection layer covers a surface of a stacked structure which is made up of the transparent substrate, the opaque layer, a photosensitive layer and the photoelectric conversion elements. The photoelectric conversion elements respectively have at least one concave portion in a plan view of the total contact type image sensor. The document illumination windows are respectively formed on a periphery of a corresponding one of the photoelectric conversion elements with a 1:1 relationship document illuminating windows respectively have at least one convex portion in the plan view in correspondence with an adjacent concave portion of a corresponding one of the photoelectric conversion elements. According to the total contact type image sensor of the present invention, the distance over which the photoelectric conversion element and the document illumination window confront each other can be set long. For this reason, it is possible to obtain a high S/N ratio and a high resolution.

Still another object of the present invention is to provide a total contact type image sensor for reading a document which is illuminated by a light from a light source via the total contact type image sensor, including a transparent substrate and an opaque layer formed on the transparent substrate. The opaque layer has document illuminating windows through which the light from the light source illuminates the document. A photosensitive layer is formed on the transparent substrate and the opaque layer, and a plurality of photoelectric conversion elements are arranged on the transparent substrate with a predetermined pitch for receiving a reflected light from the document. A transparent protection layer which covers a surface of a stacked structure is made up of the transparent substrate, the opaque layer, a photosensitive layer and the photoelectric conversion elements. The photoelectric conversion elements respectively have at least one concave portion in a plan view of the total contact type image sensor. The document illumination windows are respectively formed on a periphery of a corresponding one of the photoelectric conversion elements with a 1:1 relationship. The document illuminating windows respectively have at least one convex portion in the plan view in correspondence with an adjacent concave portion of a corresponding one of the photoelectric conversion elements.

Other objects and further features of the present invention will be apparent from the following detailed description when read in conjunction with the accompanying drawings.

BRIEF DESCRIPTION OF THE DRAWINGS

FIG 18 is a cross sectional view showing an essential part of a sixth embodiment of the total contact type image sensor according to the present invention; and FIGS. 19A, 19B and 19C respectively show shapes of document illumination windows.

DESCRIPTION OF THE PREFERRED EMBODIMENTS

Figure 1:
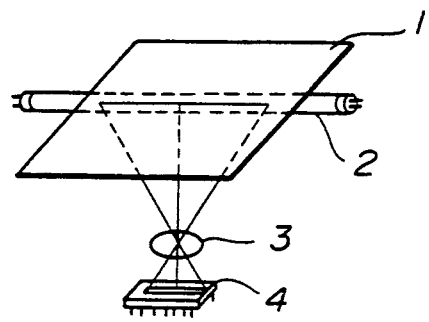
FIG. 1 is a perspective view generally showing an example of a conventional non-contact type image sensor using CCD.
Figure 2:
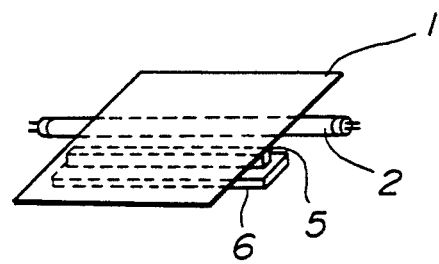
FIG. 2 is a perspective view generally showing an example of a conventional contact type image sensor.
Figure 3:
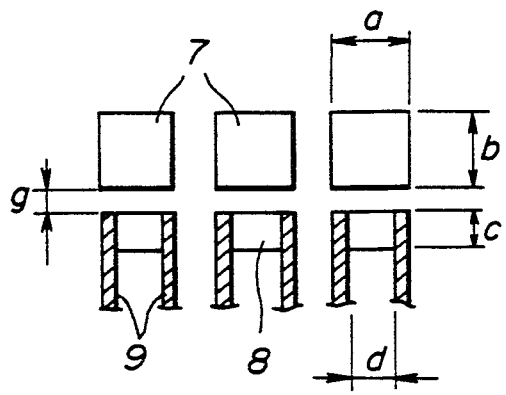
FIG. 3 is a plan view showing an essential part of an example of a conventional total contact type image sensor.
Figure 4:
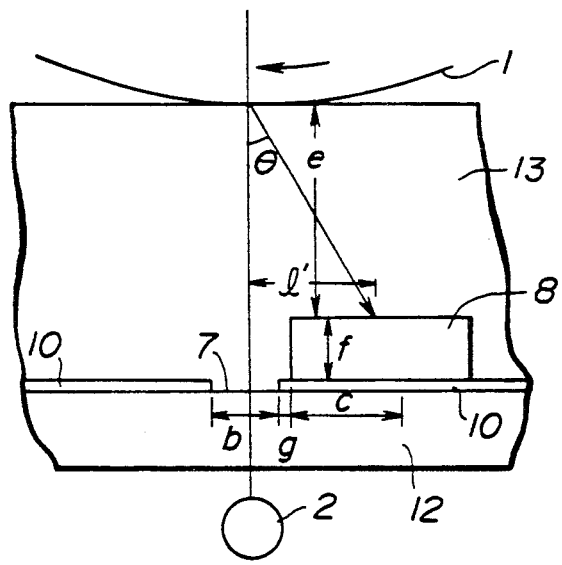
FIG. 4 is a cross sectional view showing the conventional total contact type image sensor shown in FIG. 3.
Figure 5:
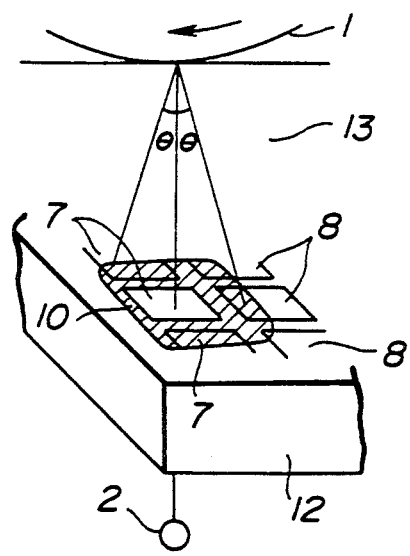
FIG. 5 is a perspective view for explaining the operation of the conventional total contact type image sensor shown in FIGS. 3 and 4.
Figure 6:
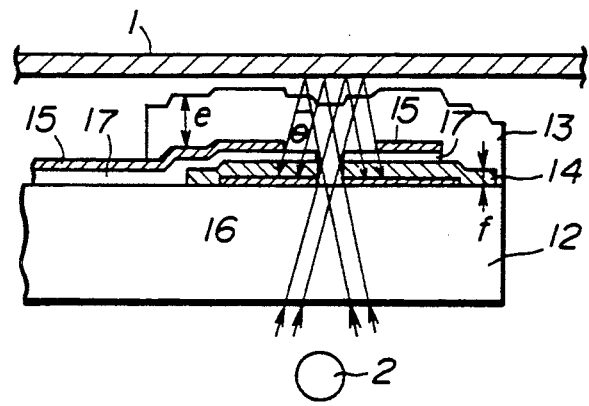
FIG. 6 is a cross sectional view showing an essential part of another example of the conventional total contact type image sensor.
Figure 7:
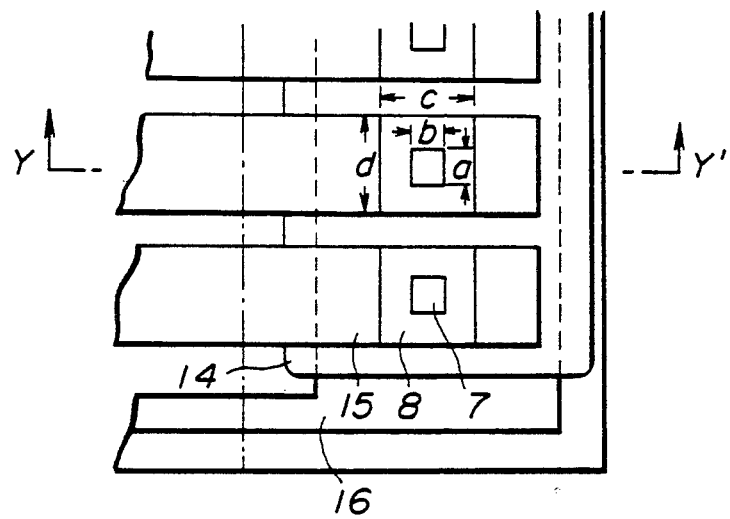
FIG. 7 is a plan view showing the conventional total contact type image sensor shown in FIG. 6.
Figure 8:
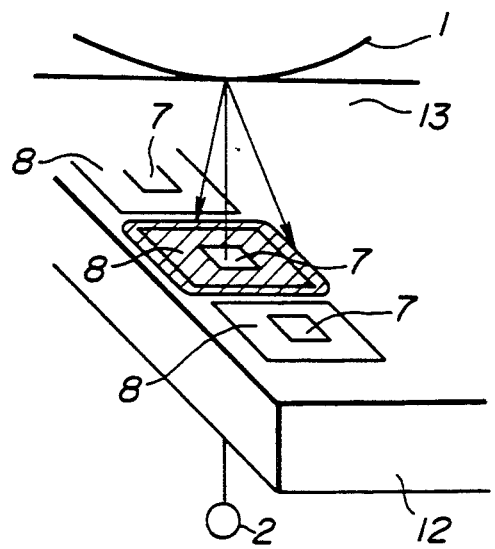
FIG. 8 is a perspective view for explaining the operation of the conventional total contact type image sensor shown in FIGS. 6 and 7.
Figure 9:
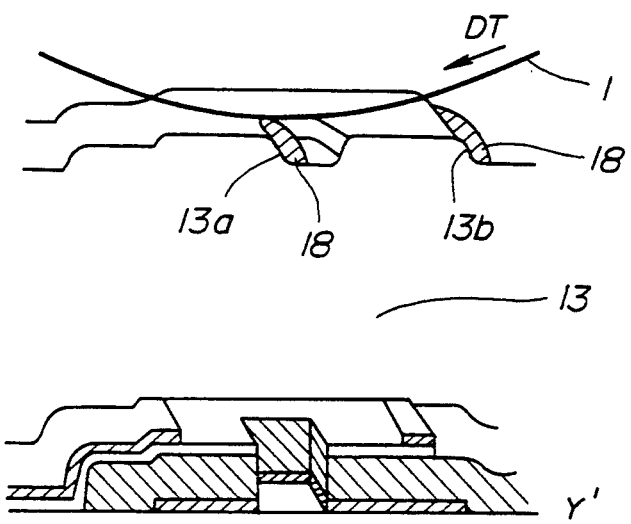
FIG. 9 shows a surface portion of the conventional total contact type image sensor shown in FIGS. 6 and 7.
Figure 10:
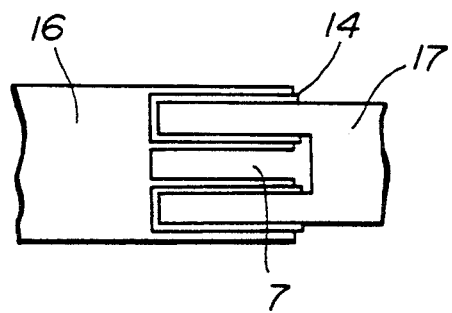
FIG. 10 is a plan view showing still another example of the conventional total contact type image sensor.
Figure 11:
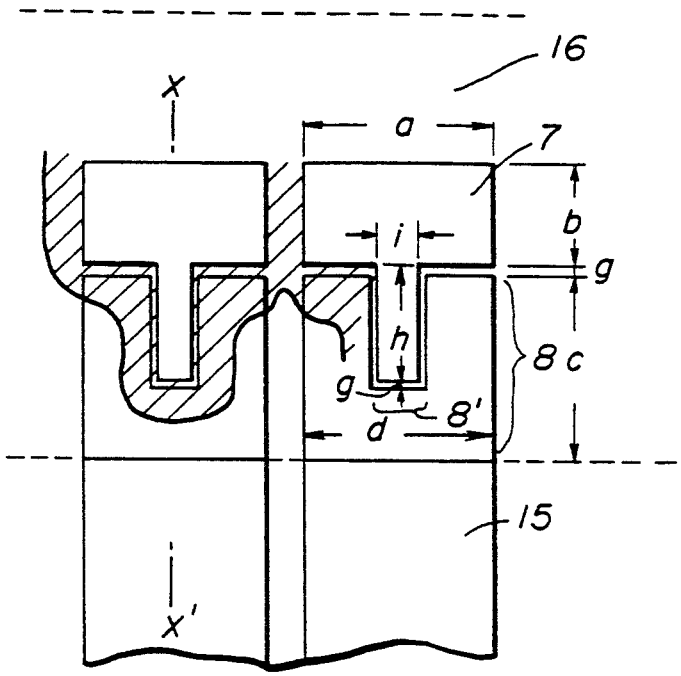
FIG. 11 is is a plan view showing an essential part of a first embodiment of a total contact type image sensor according to the present invention.
Figure 12:
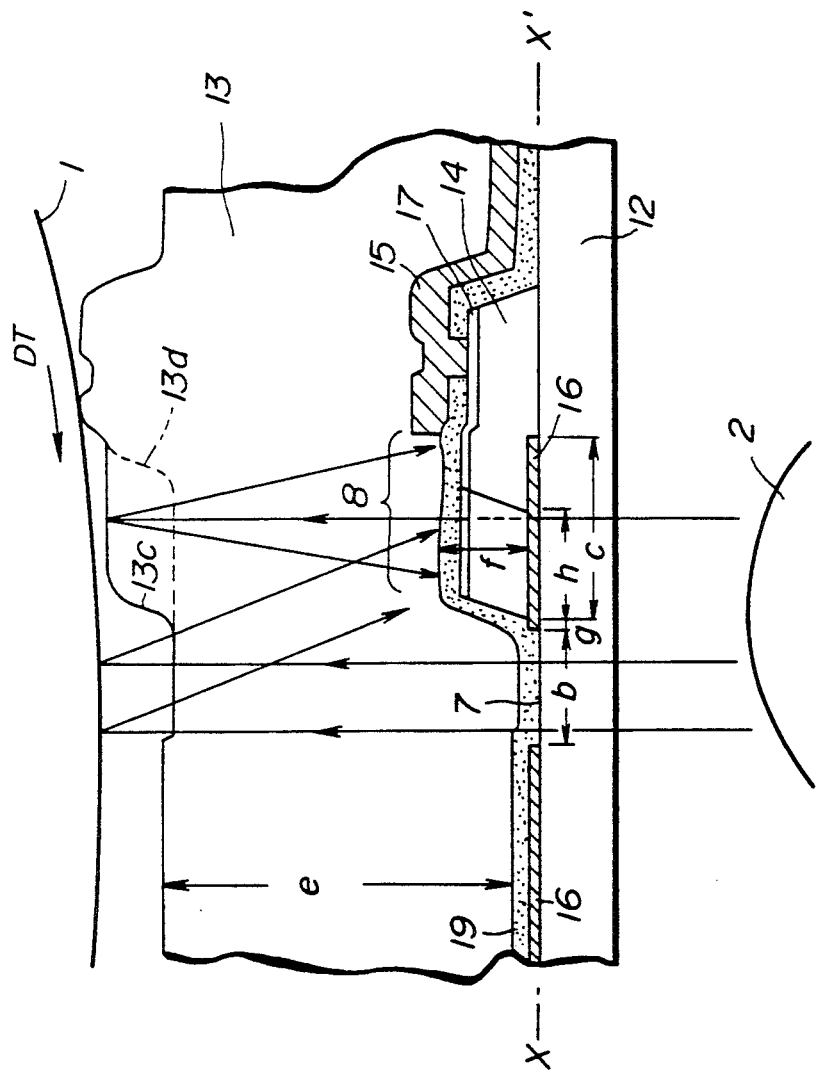
FIG. 12 is a cross sectional view showing the total contact type image sensor shown in FIG. 11.

A description will be given of a first embodiment of a total contact type image sensor according to the present invention, by referring to FIGS. 11 and 12. FIGS. 11 and 12 are a plan view and a cross sectional view respectively showing an essential part of this embodiment.

In this embodiment, the total contact type image sensor includes document illumination windows 7 which have the shape of teeth of a comb and photoelectric conversion elements 8 which have the shape of corresponding spaces of the comb between the teeth. In other words, the document illumination windows 7 have a convex shape while the photoelectric conversion elements 8 have a corresponding concave shape. The document illumination windows 7 are arranged in the document transport direction DT, and openings 8' of the photoelectric conversion elements 8 are arranged to face the document transport direction DT.

As described above, the optical path of the total contact type image sensor is short. For this reason, the reflected light from the document 1 only reaches the region of the photoelectric conversion elements 8 in a vicinity of the document illumination windows 7 and a high S/N ratio could not be obtained. However, according to this embodiment, the photoelectric conversion element 8 and the vicinity of the document illumination window 7 confront over a long distance due to the shapes of the photoelectric conversion element 8 and the document illumination window 7, thereby making it possible to obtain a high S/N ratio.

Figure 13:
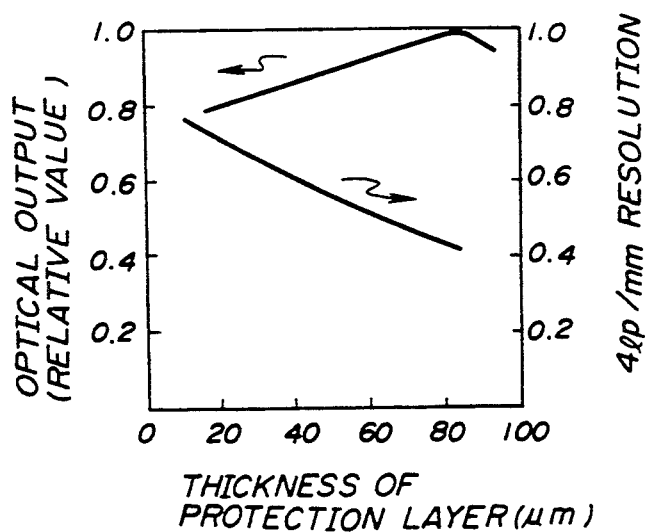
FIG. 13 shows optical output and resolution versus thickness of transparent protection layer characteristics.

Next, a description will be given of the characteristics of this embodiment for the case where the photoelectric conversion elements 8 are provided with the density of 8 bit/mm. FIG. 13 shows optical output and resolution versus thickness of the transparent protection layer characteristics. In FIG. 13, the left ordinate indicates the optical output in relative value, the right ordinate indicates the resolution in 4 lp/mm, and the abscissa indicates the thickness of the transparent protection layer 13. It may be seen from FIG. 13 that the S/N ratio is improved as the optical output increases.

The optical output does not decrease considerably even when the transparent protection layer 13 is relatively thin, as may be seen from FIG. 13. This is because a portion of the document illumination window 7 cuts into the photoelectric conversion element 8 and the photoelectric conversion element 8 can effectively receive the reflected light from the document 1. The crosstalk to the adjacent photoelectric conversion elements 8 decreases since the transparent protection layer 13 can be made thin, and it is therefore possible to realize a total contact type image sensor having a high resolution and a high S/N ratio.

Next, a description will be given of the structure and production method of this embodiment, by referring to FIGS. 11 and 12. When forming the photoelectric conversion elements 8 with the density of 8 bit/mm, an opaque metal layer made of Cr or the like is formed to a thickness of 500 to 3000 Å and desirably in the range of 700 to 2000 Å on a transparent substrate 12. For example, the transparent substrate 12 is made of pirex glass or quartz. The opaque metal layer is patterned by a photolithography technique so as to form the document illumination windows 7 and a lower common electrode 16.

The dimensions of the document illumination window 7 are as follows. That is, the side a is ⅛ mm or less. Hence, the side a is in the range of 50 to 100 $\mu$m and desirably in the range of 60 to 90 $\mu$m. The sides b and h is selected so that (b+h)<⅛ mm. That is, the side b is in the range of 0 to 60 $\mu$m and desirably in the range of 20 to 50 $\mu$m, and the side h is in the range of 40 to 90 $\mu$m and desirably in the range of 50 to 80 $\mu$m. In addition, the side i is in the range of 10 to 70 $\mu$m and desirably in the range of 20 to 50 $\mu$m.

Next, a photosensitive layer 14 which is made of amorphous silicon is formed on the stacked structure to a thickness of 1000 to 20000 Å and desirably in the range of 8000 to 15000 Å by a plasma CVD, a sputtering or the like. The photosensitive layer 14 includes oxygen and is made up of at least one layer.

A transparent electrode 17 is formed by forming an ITO layer to a thickness of 300 to 800 Å and desirably in the range of 400 to 700 Å on the photosensitive layer 14. The ITO layer is etched into the comb shape by a photolithography technique and the photoelectric conversion elements 8 are formed. The comb shaped photoelectric conversion elements 8 have the following dimensions. The gap g between the photoelectric conversion element 8 and the document illumination window 7 is 2 to 10 $\mu$m and desirably in the range of 5 to 7.5 $\mu$m. The sides c and d must be ⅛ mm or less for the photoelectric conversion elements 8 which are provided with the density of 8 bit/mm. Thus, the sides c and d respectively are 80 to 120 $\mu$m and desirably in the range of 90 to 100 $\mu$m.

Then, an interlayer insulator 19 is formed on the stacked structure to insulate the end surface of each photoelectric conversion element 8 and each upper electrode 15. This interlayer insulator 19 is made of a transparent insulator such as amorphous SiON which is formed by a plasma CVD and has a thickness of 500 to 5000 Å and desirable in the range of 700 to 2800 Å. The upper independent electrodes 15 are formed by forming contact holes in the interlayer insulator 19 by a photolithography technique, forming an Al layer on the stacked structure and patterning the Al layer into predetermined shapes by a photolithography technique. Finally, the transparent protection layer 13 is formed on the document illumination windows 7 and the photoelectric conversion elements 8. The transparent protection layer 13 is formed by depositing amorphous SiON, amorphous SiOH or the like by a plasma CVD or ECR. Alternatively, the transparent protection layer 13 may be formed by adhering a thin glass plate on the stacked structure. The transparent protection layer 13 has a thickness of 10 to 70 μm and desirably in the range of 20 to 50 μm.

Next, a description will be given of the principle of reading the image by this embodiment of the total contact type image sensor shown in FIGS. 11 and 12. In FIG. 12, a light emitted from the light source 2 such as a xenon lamp and a light emitting diode (LED) reaches the document 1 via the transparent substrate 12, the document illumination windows 7 which have the convex shape in part, the interlayer insulator 19 and the transparent protection layer 13. The reflected light from the document 1 reaches the photoelectric conversion elements 8 which have the concave shape via the transparent protection layer 13 and the interlayer insulator 19. The photoelectric conversion elements 8 output electrical signals dependent on the received reflected light from the document 1.

Figure 14:
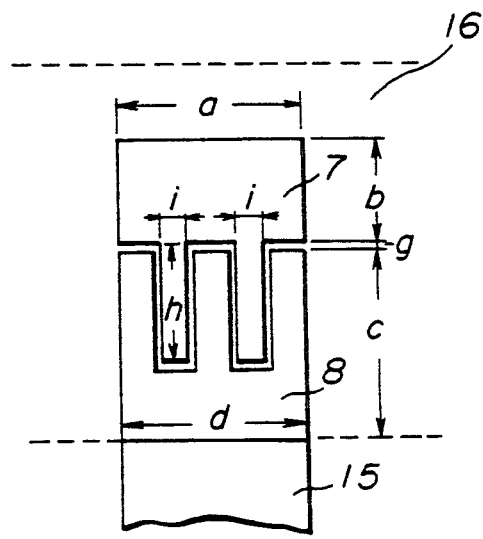
FIG. 14 is a plan view showing an essential part of a second embodiment of the total contact type image sensor according to the present invention.

The present invention is not limited to the first embodiment having the photoelectric conversion elements 8 and the document illumination windows 7 shaped as shown in FIG. 11. FIG. 14 shows an essential part of a second embodiment of the total contact type image sensor according to the present invention, in which the photoelectric conversion element 8 branches into three portions. According to this embodiment, the distance between the confronting document illumination window 7 and the photoelectric conversion element 8 can be made longer than in the first embodiment, and it is possible to obtain an improved S/N ratio.

Figure 15:
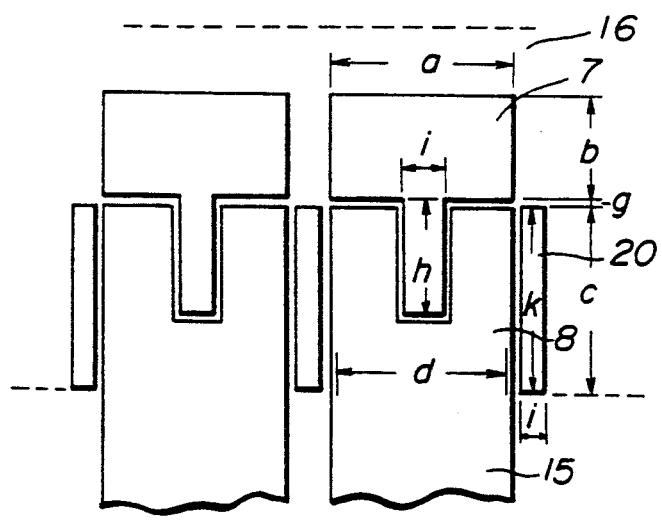
FIG. 15 s a plan view showing an essential part of a third embodiment of the total contact type image sensor according to the present invention.

FIG. 15 shows an essential part of a third embodiment of the total contact type image sensor according to the present invention. According to this embodiment, another document illumination window 20 is arranged between the photoelectric conversion elements 8. The resolution deteriorates slightly due to the crosstalk from the document illumination window to the adjacent photoelectric conversion elements 8. But on the other hand, the distance between the confronting document illumination windows 7 and 20 and the photoelectric conversion element 8 can be made even longer than in the second embodiment, thereby making it possible to obtain a further improved S/N ratio.

As a modification of the above described embodiments, the side b of the document illumination window 7 may be set to zero. In this case, the document illumination window 7 is entirely within the photoelectric conversion element 8 and the S/N ratio deteriorates slightly, however, it is possible to obtain a high resolution.

According to the first embodiment shown in FIGS. 11 and 12, foreign particles does not easily adhere on the surface of the total contact type image sensor because the photoelectric conversion elements 8 have the concave shape opening in the document transport direction DT and the document illumination windows 7 are arranged on the side of the document transport direction DT. But various modifications may be made to more positively prevent the foreign particles from adhering on the surface of the total contact type image sensor.

Figure 16:
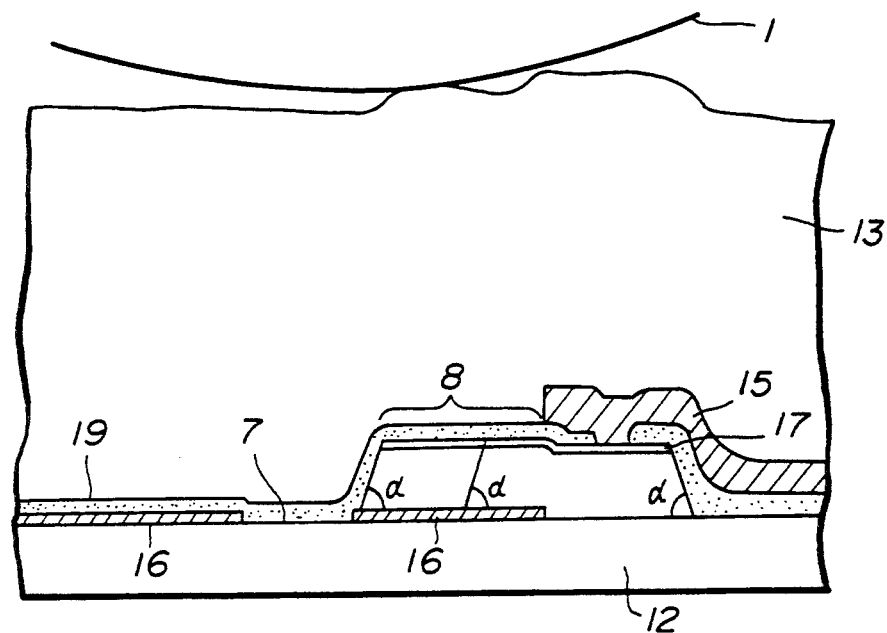
FIG. 16 is a cross sectional view showing an essential part of a fourth embodiment of the total contact type image sensor according to the present invention.

FIG. 16 shows an essential part of a fourth embodiment of the total contact type image sensor according to the present invention. In this embodiment, the end surface of the photoelectric conversion element 8 is tapered. The end surface of the photoelectric conversion element 8 is tapered with a taper angle of 20° to 70° and desirably in the range of 30° to 60°. As a result, the surface of the transparent protection layer 13 becomes smooth when a transparent insulator thin film is used as the transparent protection layer 13, and it is possible to more positively prevent foreign particles from adhering on the surface of the total contact type image sensor.

Figure 17:
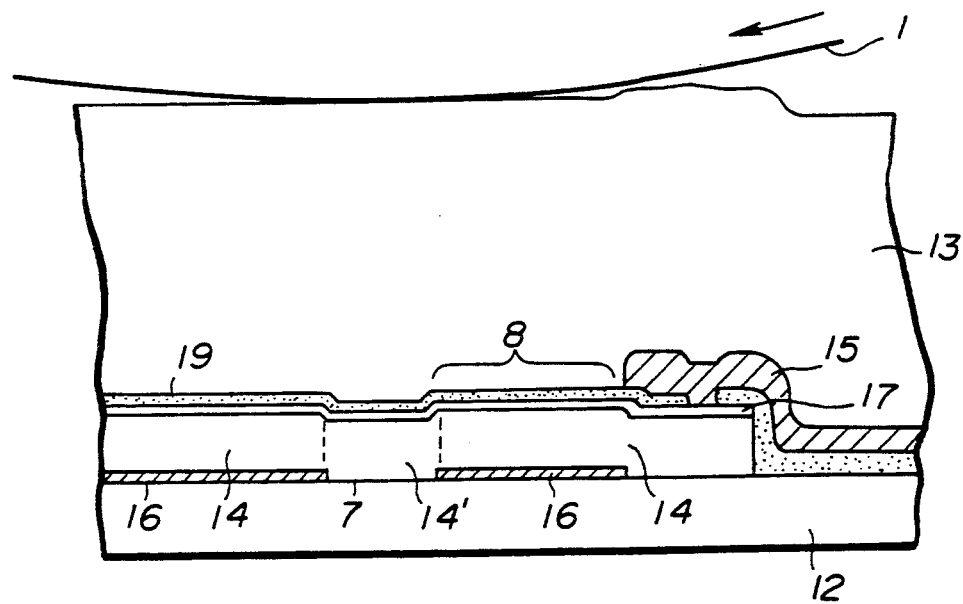
FIG. 17 is a cross sectional view showing an essential part of a fifth embodiment of the total contact type image sensor according to the present invention.

FIG. 17 shows an essential part of a fifth embodiment of the total contact type image sensor according to the present invention. In this embodiment, a portion of the photoelectric conversion element 8 is transparent to receive the light from the document illumination window 7, so as to eliminate the stepped portions which are formed on the surface of the transparent protection layer 13 above the photoelectric conversion element 8 and the document illumination window 7. In FIG. 17, the photosensitive layer 14 is also formed on the document illumination window 7, and a region 14' of the photosensitive layer 14 above the document illumination window 7 is thereafter oxidized to make the region 14' transparent. A plasma oxidation, an ion implantation or the like may be used to oxidize the region 14'. According to this embodiment, the surface of the transparent protection layer 13 is flat above the photoelectric conversion element 8 and the document illumination window 7, and the foreign particles are prevented from adhering on the surface of the transparent protection layer 13.

FIG. 18 shows a sixth embodiment of the total contact type image sensor according to the present invention. According to this embodiment, the photoelectric conversion elements 8 are formed similarly as in the case of the embodiment shown in FIG. 12. Thereafter, an $SiO_2$ layer is formed as the transparent protection layer 13 by a bias CVD using $SiH_4$, $O_2$ and Ar so that the surface of the transparent protection layer 13 is flat. This embodiment has an advantage in that the surface of the transparent protection layer 13 can be made flat by the bias CVD without affecting the layers below the transparent protection layer 13.

Next, a more detailed description will be given of the effects of the embodiments described above and the methods of producing the embodiments.

For the sake of convenience, it is assumed that in the first embodiment shown in FIGS. 11 and 12 the opaque metal thin film formed on the pirex glass substrate 12 is approximately 800 Å, and the dimensions of the document illumination window 7 are such that a=90 μm, b=30 μm, h=80 μm and i=30 μm. It is also assumed that the photosensitive layer 14 has a thickness of 1.5 μm, the ITO layer has a thickness of 500 Å, the dimensions of the photoelectric conversion elements 8 are such that g=5 μm, c=100 μm and d=100 μm, the interlayer insulator 19 is made of amorphous SiON having a thickness of 1000 Å, and the transparent protection layer 13 is made of amorphous SiON having a thickness of 30 μm.

In this case, the distance between the confronting document illumination window 7 and the photoelectric conversion element 8 is 90+80+80=250 μm which is 2.5 times longer than that of the conventional total contact type image sensor. Thus, it is possible to obtain a high S/N ratio. In addition, because a portion of the document illumination window 7 cuts into the branching photoelectric conversion element 8, it is possible to reduce the crosstalk to the adjacent photoelectric conversion elements 8 and accordingly obtain a high resolution. Furthermore, because the branching photoelectric conversion element 8 opens towards the document transport direction DT, it is possible to reduce the possibility of foreign particles adhering on the surface of the transparent protection layer 13.

For the sake of convenience, it is assumed that in the second embodiment shown in FIG. 14 a=90 μm, b=30 μm, h=80 μm, i=20 μm, g=5 μm, c =100 μm and d=100 μm. The second embodiment can be produced by a method which is substantially the same as the method used to produce the first embodiment, except that the photoelectric conversion element 8 has a comb structure branching into three portions.

In this case, the distance between the confronting document illumination window 7 and the photoelectric conversion element 8 is 90+80×4=410 μm which is 1.6 times longer than that of the first embodiment.

For the sake of convenience, it is assumed that in the third embodiment shown in FIG. 15 k=100 μm and =10 μm and other dimensions are the same as those of the first embodiment. The third embodiment can be produced by a method which is substantially the same as the method used to produce the first embodiment, except that the document illumination window 20 is further provided.

In this case, the crosstalk to the adjacent photoelectric conversion elements 8 increases due to the provision of the document illumination window 20 and the resolution deteriorates slightly. However, the distance between the confronting document illumination windows 7 and 20 and the photoelectric conversion element 8 becomes long, thereby making it possible to obtain a high S/N ratio.

The fourth embodiment shown in FIG. 16 can be produced by a method which is substantially the same as the method used to produce the first embodiment. But after forming the ITO layer, a photoresist layer is left on the photoelectric conversion elements 8 by a photolithography technique, and a dry etching is employed to form a tapered portion at the end surface of the photoelectric conversion element 8. The tapered angle is approximately 60°, for example. Thereafter, the photoresist layer on the photoelectric conversion elements 8 is removed and the transparent protection layer 13 is formed similarly as in the case of producing the first embodiment. As a result, it is possible to provide the transparent protection layer 13 having a smooth surface and the reliability of the total contact type image sensor is greatly improved. In addition, the step coverage of the upper electrodes 15 is improved by the provision of the tapered portion, thereby improving the yield of the total contact type image sensor.

The fifth embodiment shown in FIG. 17 can be produced by a method which is substantially the same as the method used to produce the first embodiment. In this case, after forming the ITO layer, each of the photoelectric conversion elements 8 are isolated by leaving the photosensitive layer 14 on the document illumination windows 7. Thereafter, the portions other than the document illumination windows 7 are covered by a photoresist layer. A plasma oxidation using $O_2$ plasma is made to make the region 14' of the photosensitive layer 14 on the document illumination windows 7 transparent and form a photoconductive region for the light. The interlayer insulator 19, the upper electrodes 15 and the transparent protection layer 13 are formed similarly to the first embodiment. As a result, it is possible to provide the transparent protection layer 13 having a smooth surface and the reliability of the total contact type image sensor is greatly improved.

The sixth embodiment shown in FIG. 18 can be produced by a method which is substantially the same as the method used to produce the first embodiment. In this case, after forming the upper electrodes 15, an $SiO_2$ layer is formed to a thickness of 30 μm as the transparent protection layer 13 by a bias CVD using $SiH_4$, $O_2$ and Ar. As a result, it is possible to provide the transparent protection layer 13 having a smooth surface and the reliability of the total contact type image sensor is greatly improved.

The following Table 1 shows the evaluation of the embodiments in terms of the shape of the document illumination window 7, the S/N ratio and the resolution for cases A, B and C respectively shown in FIGS. 19A, 19B and 19C.

TABLE 1

| Shape (Case) | Dimension | S/N Ratio | Resolution (4 lp/mm) |
|---|---|---|---|
| A | h = 80 μm, i = 30 μm | 30 dB | 64% |
| B | h = 80 μm, i = 20 μm | 32 dB | 60% |
| C | h = 80 μm, i = 30 μm<br>k = 100 μm, j = 10 μm | 35 dB | 61% |

As may be seen from Table 1, a high Ser. No. ratio and a high resolution can be obtained according to the embodiments.

The following Table 2 shows the evaluation of the fourth embodiment in terms of the taper angle of the end surface of the photoelectric conversion element 8 and the reliability of the total contact type image sensor. The results shown in Table 2 were obtained by use of an A4 size image sensor after reading 100,000 documents. The reading error (rate of unsuccessfully reading information) is obtained by assuming that a bit has a reading error when the output decreases to 80% the initial value or less.

TABLE 2

| Taper Angle | Reading Error |
|---|---|
| 40° | 0% |
| 60° | 0% |
| 90° | 0.2% |

As may be seen from Table 2, the reading error becomes zero and the reliability of the total contact type image sensor becomes high when the end surface of the photoelectric conversion element 8 is tapered to make the surface of the transparent protection layer 1 smooth.

The following Table 3 shows the evaluation of the first, fifth and sixth embodiments in terms of the smoothing of the transparent protection layer 13. The results shown in Table 3 were obtained after reading 100,000 copied prints, and the reliability is evaluated in terms of the reading error. In Table 3, a case a) corresponds to the first embodiment with a taper angle of 90°, a case b) corresponds to the fifth embodiment in which the region 14' is made transparent by oxidizing the photosensitive layer 14, and a case c) corresponds to the sixth embodiment in which the transparent protection layer 13 is formed by smoothing the surface thereof.

TABLE 3

| Case | Reading Error |
| --- | --- |
| a) | 0.2% |
| b) | 0% |
| c) | 0% |

As may be seen from Table 3, the reliability of the total contact type image sensor becomes high by making the surface of the transparent protection layer 13 flat in the fifth and sixth embodiments.

The following Table 4 shows the evaluation of the first embodiment in terms of the material making up the transparent protection layer 13, the S/N ratio and the resolution.

TABLE 4

| Material | Thickness ($\mu$m) | S/N Ratio (dB) | Resolution (4 lp/mm) |
| --- | --- | --- | --- |
| Thin Glass Plate | 20 | 25 | 70% |
|  | 30 | 30 | 64% |
|  | 40 | 32 | 60% |
| Amorphous SiN | 20 | 24 | 72% |
|  | 30 | 28 | 66% |
|  | 40 | 30 | 62% |
| Amorphous SiON | 20 | 24 | 72% |
|  | 30 | 27 | 60% |
|  | 40 | 29 | 60% |

From the evaluations described with reference to Tables 1 through 4, it can be readily seen that according to the total contact type image sensor according to the present invention, it si possible to obtain a high S/N ratio, a high resolution and a high reliability in that foreign particles are prevented from adhering on the image sensor even after a larger number of documents are read.

Further, the present invention is not limited to these embodiments, but various variations and modifications may be made without departing from the scope of the present invention.

What is claimed is:

1. A total contact type image sensor comprising:
   a transparent substrate;
   an opaque layer formed on said transparent substrate and having document illuminating windows;
   a photosensitive layer formed on said transparent substrate and said opaque layer;
   a plurality of photoelectric conversion elements arranged on said transparent substrate with a predetermined pitch, said transparent substrate, said opaque layer, a photosensitive layer and said photoelectric conversion elements forming a stacked structure; and
   a transparent protection layer which covers a surface of said stacked structure,
   said photoelectric conversion elements respectively having at least one concave portion in a plan view of the total contact type image sensor,
   said document illumination windows being respectively formed on a periphery of a corresponding one of said photoelectric conversion elements with a 1:1 relationship,
   said document illuminating windows respectively having at least one convex portion in the plan view in correspondence with the concave portion of a corresponding one of said photoelectric conversion elements so as to be adjacent to the corresponding one of said photoelectric conversion elements.

2. The total contact type image sensor as claimed in claim 1 wherein said photoelectric conversion elements respectively have a generally U-shaped portion in the plan view and said document illumination windows respectively have a generally T-shaped portion in the plan view, said U-shaped portion and said T-shaped portion fitting into each other in the plan view.

3. The total contact type image sensor as claimed in claim 1 wherein each of said photoelectric conversion elements have two or more concave portions in the plan view and each of said document illumination windows have two or more convex portions in the plan view, said concave portions and said convex portions fitting into each other in the plan view.

4. The total contact type image sensor as claimed in claim 1 wherein each of said photoelectric conversion elements have a tapered end surface.

5. The total contact type image sensor as claimed in claim 4 wherein said tapered end surface has a taper angle in a range of approximately 30° to 80°.

6. The total contact type image sensor as claimed in claim 1 which further comprises another document illumination window in said opaque layer between each two mutually adjacent photoelectric conversion elements.

7. The total contact type image sensor as claimed in claim 1 wherein a portion of said photoelectric conversion element is transparent for receiving a light transmitted through a corresponding one of said document illumination windows.

8. The total contact type image sensor as claimed in claim 7 wherein said photosensitive layer includes an oxidized region which forms said transparent portion.

9. The total contact type image sensor as claimed in claim 1 wherein said transparent protection layer has generally flat surface for making sliding contact with a document which is to be read.

10. The total contact type image sensor as claimed in claim 9 wherein said transparent protection layer is made of $SiO_2$ which is formed by a bias chemical vapor deposition using $SiH_4$, $O_2$ and Ar.

11. The total contact type image sensor as claimed in claim 1 wherein said concave portion of said photoelectric conversion element opens in a direction in which a document is transported when said transparent protection layer makes sliding contact with the document.

12. The total contact type image sensor as claimed in claim 1 wherein said photoelectric conversion elements have a comb shape in the plan view and said document illumination windows have a comb shape which corresponds to the comb shape of said photoelectric conversion elements.

13. A total contact type image sensor for reading a document which is illuminated by a light from a light source via the total contact type image sensor, said total contact type image sensor comprising:
   a transparent substrate;
   an opaque layer formed on said transparent substrate and having document illuminating windows through which the light from the light source illuminates the document;
   a photosensitive layer formed on said transparent substrate and said opaque layer;
   a plurality of photoelectric conversion elements arranged on said transparent substrate with a predetermined pitch for receiving a reflected light from the document, said transparent substrate, said opaque layer, a photosensitive layer and said photoelectric conversion elements forming a stacked structure; and a transparent protection layer which covers a surface of said stacked structure, said photoelectric conversion elements respectively having at least one concave portion in a plan view of the total contact type image sensor, said document illumination windows being respectively formed on a periphery of a corresponding one of said photoelectric conversion elements with a 1:1 relationship, said document illuminating windows respectively having at least one convex portion in the plan view in correspondence with the concave portion of a corresponding one of said photoelectric conversion elements so as to be adjacent to the corresponding one of said photoelectric conversion elements.

14. The total contact type image sensor as claimed in claim 13 wherein said photoelectric conversion elements respectively have a generally U-shaped portion in the plan view and said document illumination windows respectively have a generally T-shaped portion in the plan view, said U-shaped portion and said T-shaped portion fitting into each other in the plan view.

15. The total contact type image sensor as claimed in claim 13 wherein each of said photoelectric conversion elements have two or more concave portions in the plan view and each of said document illumination windows have two or more convex portions in the plan view, said concave portions and said convex portions fitting into each other in the plan view.

16. The total contact type image sensor as claimed in claim 13 wherein each of said photoelectric conversion elements have a tapered end surface.

17. The total contact type image sensor as claimed in claim 16 wherein said tapered end surface has a taper angle in a range of approximately 30° to 80°.

18. The total contact type image sensor as claimed in claim 13 which further comprises another document illumination window in said opaque layer between each two mutually adjacent photoelectric conversion elements.

19. The total contact type image sensor as claimed in claim 13 wherein a portion of said photoelectric conversion element is transparent for receiving the light transmitted through a corresponding one of said document illumination windows.

20. The total contact type image sensor as claimed in claim 19 wherein said photosensitive layer includes an oxidized region which forms said transparent portion.

21. The total contact type image sensor as claimed in claim 13 wherein said transparent protection layer has generally flat surface for making sliding contact with the document.

22. The total contact type image sensor as claimed in claim 21 wherein said transparent protection layer is made of $SiO_2$ which is formed by a bias chemical vapor deposition using $SiH_4$, $O_2$ and Ar.

23. The total contact type image sensor as claimed in claim 13 wherein said concave portion of said photoelectric conversion element opens in a direction in which the document is transported when said transparent protection layer makes sliding contact with the document.

24. The total contact type image sensor as claimed in claim 13 wherein said photoelectric conversion elements have a comb shape in the plan view and said document illumination windows have a comb shape which corresponds to the comb shape of said photoelectric conversion elements.

* * * * *